United States Patent [19]

Morterol et al.

[11] Patent Number: 5,545,378
[45] Date of Patent: Aug. 13, 1996

[54] FLUIDIZED BED REACTOR WITH POLYMER RECYCLE LINE

[75] Inventors: Frederic R. M. M. Morterol, Sausset-les-Pins; Charles Raufast, Martigues, both of France

[73] Assignee: BP Chemicals Limited, London, England

[21] Appl. No.: 416,285

[22] Filed: Apr. 4, 1995

Related U.S. Application Data

[62] Division of Ser. No. 92,809, Jul. 16, 1993, Pat. No. 5,434,228.

[30] Foreign Application Priority Data

Jul. 16, 1992 [FR] France .................................. 92 09063
Jul. 16, 1992 [FR] France .................................. 92 09064

[51] Int. Cl.⁶ ........................................................ C08F 2/34
[52] U.S. Cl. .................................. 422/132; 422/138
[58] Field of Search ............................ 526/901, 67, 68, 526/69, 70; 422/132, 138

[56] References Cited

U.S. PATENT DOCUMENTS 4,003,712  1/1977  Miller ...................................... 526/901

FOREIGN PATENT DOCUMENTS 2137441  12/1972  France .

Primary Examiner—Thomas R. Weber
Attorney, Agent, or Firm—Nixon & Vanderhye

[57] ABSTRACT

The present invention relates to a gas phase fluidized bed reactor (1) comprising an upright tubular portion (2) having a fluidization grid (4) in the lower part thereof. According to the invention the upright tubular portion (4) is provided with an external conduit (13) which connects a lower orifice (14) which is above the fluidization grid (4) and an upper orifice (15) which is a height above the lower orifice (14). The invention also relates to a gas phase polymerization process carried out in the reactor.

6 Claims, 2 Drawing Sheets

5,545,378

FLUIDIZED BED REACTOR WITH POLYMER RECYCLE LINE

This is a Rule 60 Divisional of application Ser. No. 08/092,809, filed 16 Jul. 1993, now U.S. Pat. No. 5,434,228.

The present invention relates to a gas phase fluidized bed reactor. It also relates to a gas phase polymerization process carried out in the reactor.

BACKGROUND OF THE INVENTION

It is known to polymerize one or more olefins by starting with a fluidization gas containing the olefin(s) to be polymerized, in a fluidized bed reactor, in which polymer particles being formed are kept in the fluidized state by means of the fluidization gas travelling in an upward stream. The fluidization gas leaving at the top of the fluidized bed reactor returns to the base of the latter by means of a recycling conduit equipped with a compressor and generally with a heat exchanger.

During a fluidized bed polymerization, it has been observed that small variations in the progress of the polymerization, resulting, for example, from unavoidable slight fluctuations in the quality of the catalyst or of the olefins used, can give rise to changes in the behaviour and the catalytic activity of the polymer particles being formed. These small variations can cause an unexpected increase in the quantity of heat released by the polymerization. This can give rise to the appearance of hot spots in the bed and the formation of agglomerates of molten polymer. It is generally thought that a large fraction of these agglomerates is formed in the regions of the fluidized bed which are poorly stirred, and in particular along the vertical wall of the reactor.

It is also known to withdraw polymer from a fluidized bed reactor. The withdrawing of the polymer is generally accompanied by a quantity of gas which can be a relatively large quantity.

DESCRIPTION OF THE INVENTION

A fluidized bed reactor has now been found in which it is possible to carry out a polymerization process with a reduced formation of polymer agglomerates. During this process a very appreciable increase in the agitation of polymer can be obtained. Thus this process can make it possible to manufacture polymers continuously with a high output efficiency without undue concern for unavoidable slight variations in the quality of the monomers or of the catalyst which are employed. Furthermore, the polymer produced can be withdrawn from the polymerization reactor with a relatively low quantity of gas.

The present invention therefore relates to a gas phase fluidized bed reactor comprising an upright tubular portion having a fluidization grid in the lower part thereof characterised in that the upright tubular portion is provided with an external conduit which connects a lower orifice which is above the fluidization grid and an upper orifice which is at a height above the lower orifice.

The fluidized bed reactor essentially comprises an upright tubular portion, which is generally a cylinder, intended to contain a fluidized bed. The tubular portion can be surmounted by a disengagement chamber having a larger cross section. The reactor is generally equipped with a recycling conduit for recycling the fluidization gas, connecting the top of the reactor, and in particular the top of the disengagement chamber, to the lower part of the reactor which is situated under the fluidization grid.

When the tubular portion is a cylinder, the part of the cylinder which is situated above the fluidization grid has a height H, generally such that the ratio H/D is between 1 and 15 and preferably between 2 and 8; D denoting the internal diameter of the cylinder. This part of the reactor is intended to be at least partially occupied by the fluidized bed over a height h. This height h is in most cases such that the ratio h/H is between 0.2 and 1, preferably between 0.4 and 0.8.

According to the invention the reactor comprises at least one external conduit which connects a lower orifice to an upper orifice which are situated on the wall of the upright portion at different heights above the fluidization grid. These two orifices can be situated one above the other on the same generatrix of the cylinder of the reactor. Furthermore, they can be very distant from each other. More particularly, the lower orifice can be situated above the fluidization grid at a height, measured in relation to the plane of the fluidization grid, which is less than 0.5×H and preferably less than 0.2×H, while the upper orifice can be situated in the upper part of the cylinder at a height, measured in relation to the plane of the fluidization grid, which is greater than 0.5×H. In most cases the lower orifice is situated immediately above the fluidization grid.

The external conduit generally has a uniform internal diameter. The latter can advantageously permit a circulation of polymer inside the external conduit with a velocity ranging from 0.1 to 20 m/s. In most cases the internal diameter of the external conduit represents from 0.1 to 0.01 times the internal diameter of the cylinder of the reactor. This external conduit can have a large number of shapes. However, this conduit preferably has a total length L which is as short as possible and comprises few angular parts in order to limit the pressure drops when it is being employed. It generally consists of a number of sections, at least one of which is substantially vertical, which are placed end to end using bends. As shown by way of example in FIG. 1, it can consist of a vertical section connected by two horizontal sections to the cylinder of the reactor. Alternately, as shown by way of example in FIG. 2, the external conduit can also comprise a part situated below the horizontal plane containing the lower orifice.

The external conduit preferably does not project into the tubular portion, so as not to perturb the operation of the fluidized bed.

Furthermore, in order to facilitate the entry of polymer into the external conduit, the latter opens into the tubular portion at the lower orifice preferably perpendicularly to the wall of the reactor. At the upper orifice, it can open into the tubular portion in any direction. Preferably, it opens perpendicularly to the wall of the tubular portion. It can also open into the tubular portion in a direction pointing downwards with an inclination, measured in relation to the horizontal plane, which can be up to 60° and in particular of between 10° and 50°. It can also open in a direction pointing upwards.

The external conduit can be equipped with one or a number of feed conduits for additional gas. The point(s) of introduction of additional gas are generally situated in the lower part of the external conduit and in particular at or adjacent to the lowest part. Typically, the points of introduction are situated at a distance from the lower orifice which is less than L/2, and more particularly less than L/4. When the external conduit has a part situated below the horizontal plane containing the lower orifice, the feed conduit for additional gas can open into the external conduit at a point which is preferably situated below this plane, and this makes it easily possible to use an additional gas at a higher pressure than that in the fluidized bed. The point(s) of introduction of additional gas are generally situated at a position such as to avoid or at least minimise the circulation of additional gas towards the lower orifice. As shown in FIG. 1 or FIG. 2, a feed conduit for additional gas can open into the external conduit at or adjacent to the lower end of a vertical section whose upper end is situated adjacent to the upper orifice, in order to facilitate the polymer circulation and its return into the tubular portion.

The external conduit can also be equipped with feed conduits for components selected for example from the group comprising a catalyst, optionally prepolymerized, a cocatalyst, an activator, an activity retarder or a constituent of the fluidization gas. These various conduits can open into the external conduit at points preferably situated downstream of a point of introduction of additional gas.

The external conduit can be equipped with means for isolating the conduit from the remainder of the reactor. For example, the external conduit can be equipped with a lower valve positioned in the external conduit towards and preferably adjacent to the lower orifice and with an upper valve positioned towards and preferably adjacent to the upper orifice. When these valves are closed the external conduit is isolated from the remainder of the reactor.

Furthermore, the external conduit can be equipped with a discharge conduit fitted with a discharge valve which allows the external conduit to be used to withdraw polymer from the reactor. The discharge conduit is arranged so as to be able to discharge from the reactor preferably most of the polymer contained in the external conduit. The discharge of the polymer can take place by gravity and/or under the effect of a pressure difference within and downstream of the external conduit. The discharge conduit can open into the external conduit at an adjacent to the lowest point. When the external conduit comprises at least one vertical section, the discharge conduit opens into the external conduit preferably at or adjacent to the lower end of a vertical section and in particular of the longest vertical section.

The external conduit can be equipped with a gas purge conduit fitted with a purge valve. This purge conduit preferably opens into the upper part of the external conduit and in particular into the highest part. The purge conduit is intended to discharge gas from the external conduit after it is isolated.

The external conduit can also be connected to a draw-off vessel via the discharge conduit. The latter can be of any shape and preferably has a volume of between 1/10 and 1/1000 and more particularly between 1/10 and 1/500 of the volume of polymer contained in the reactor. This draw-off vessel can be equipped with a gas purge conduit fitted with a purge valve. A receiving vessel can be arranged downstream of the draw-off vessel. This receiving vessel can be a device for freeing the polymer drawn off from the gas which can accompany it, or a storage vessel. The receiving vessel can also be a gas phase polymerization reactor containing a fluidized bed identical with or different from the reactor of the invention.

The subject of the invention also relates to a gas phase polymerization process carried out in the fluidized bed reactor described above in which the bed is fluidized with a fluidization gas, characterised in that the fluidization gas is allowed to pass through the external conduit.

The gas phase polymerization is carried out using a fluidization gas which is a reaction gas mixture containing the monomer to be polymerized. According to the invention, this fluidization gas is allowed to pass through the external conduit. After being passed through the external conduit the fluidization gas returns into the reactor into the fluidized bed or above the fluidized bed.

According to one particular embodiment of the process, polymer also passes through the external conduit and is returned to the reactor. That means that the polymer enters into the external conduit through the lower orifice, circulates in the external conduit and returns to the reactor through the upper orifice. The polymer returns to the reactor into the fluidized bed or above the fluidized bed.

According to the latter embodiment, the circulation of the polymer in the external conduit preferably takes place at a higher velocity than that of the fluidization gas passing through the tubular portion of the reactor and, more particularly, at a velocity ranging from 0.1 to 20 m/s, preferably from 0.5 to 5 m/s. To improve the agitation of the polymer within the reactor the flow rate of polymer through the external conduit is preferably 0.5 to 2 times the rate of removal of polymer from the reactor e.g. for a production rate of 1.0 tonne/hour the quantity of polymer circulating in the external conduit would be from 0.5 to 2 tonnes/hour.

The circulation of polymer in the external conduit can occur with only the help of the fluidization gas. However, it can also be achieved with the use of an additional gas which is directly introduced into the external conduit so as to dilute the polymer.

The introduction of additional gas can be performed in one or more places which are preferably situated in the first part of the external conduit. Very advantageously, the introduction of additional gas into the external conduit is performed so that the polymer is first of all diluted in the first part of the external conduit, preferably while not being kept in the fluidized state, and then in the second part of the conduit, is conveyed pneumatically to return into the tubular portion.

The additional gas can be an inert gas such as nitrogen. It can also be identical with the fluidization gas, and is generally at a higher pressure than that at the bottom of the fluidized bed. Furthermore, bearing in mind the fact that the polymer which is in the external conduit can contain a catalyst or a high activity catalyst system, it is preferable to employ an additional gas whose temperature is lower, in most cases by at least 10° C., than the polymerization temperature. This is especially necessary when the additional gas contains at least one monomer, in order to reduce the rate of the polymerization reaction in the external conduit and to reduce the risk of a blockage of the external conduit. In this case it is recommended that the additional gas should be a fraction of the fluidization gas which is abstracted after cooling and compression.

A component can be directly introduced into the external conduit of the reactor. The component can, for example, comprise one or more components selected from the group comprising a solid catalyst optionally prepolymerized, a cocatalyst, an activator, an activaty retarder or a constituent of the fluidization gas. A component is advantageously introduced into into an external conduit through which polymer is circulating. Thus, the component introduced is rapidly well dispersed in all the reactor and no blockage of the external conduit is observed.

When the polymer passes through the external conduit the agitation of the polymer particles in the reactor is increased especially along the inner wall of the reactor. Furthermore the formation of polymer agglomerates is reduced. This reduction is also important when a component such as a catalyst, a cocatalyst or an activator is introduced into the external conduit.

The polymer produced can advantageously be withdrawn from the reactor using a method for withdrawing which comprises (a) isolating the external conduit from the remainder of the reactor and (b) opening a withdrawing means arranged so that the polymer can be discharged from the external conduit.

The first stage of the method for withdrawing consists in isolating the external conduit from the remainder of the reactor which is still producing polymer. As a result of this stage the external conduit contains polymer accompanied by a gas which is at a pressure equal to that in the remainder of the reactor. During this stage it is preferred to stop the introduction of gas into the external conduit.

Following the first stage it is possible to perform an intermediate stage which consists in lowering the pressure of the gas accompanying the polymer contained in the external conduit. To carry out this operation a purge means can be used until the desired pressure is obtained. The method for withdrawing can thus include a polymer degassing stage. Bearing in mind the fact that the polymer contained in the external conduit is at an elevated temperature, close to the polymerization temperature, it is found during this degassing that the separation of the constituents of the fluidization gas, especially any constituents having a relatively high boiling point, from the polymer, is greatly facilitated. Furthermore, the gas separated from the polymer, optionally after cooling, is advantageously recycled into the reactor. Following this degassing operation the polymer can be fluidized with the aid of a gas, such as an inert gas, especially in order to separate the less volatile constituents from the polymer.

The second stage consists in removing from the external conduit part or preferably all of the polymer by opening a withdrawing means. During this operation the polymer can be discharged towards the outside of the external conduit by gravity.

The stages of the method for withdrawing form a sequence which makes it possible to draw off a single quantity of polymer and which can last, for example, from 20 to 360 seconds. The draw-off sequence can be repeated a number of times and preferably cyclically. In particular, from 10 to 180 sequences per hour can be performed.

When the external conduit is equipped with isolation valves and with a discharge valve the method for withdrawing the polymer can be performed by (a) isolating the external conduit by closing the lower an upper valves and (b) discharging the polymer contained in the external conduit between the lower and upper valves by opening the discharge valve.

The method for withdrawing can be applied to the drawing off of the polymer output of the reactor in continuous operation. It can also be applied to the partial or total draining of the reactor especially when it is desired to change the quality of the polymer and in particular the melt index of the polymer produced in the reactor. The same process can also be employed for draining the polymerization reactor in which the polymerization has been interrupted.

The present invention is particularly suitable for gas phase manufacture of polymers by polymerization of one or more alpha-olefins containing for example from 2 to 12 carbon atoms, such as ethylene, propylene, 1-butene, 1hexene, 4-methyl-1-pentene or 1-octene. It is very particularly suitable for the polymerization or copolymerization of ethylene or of propylene, optionally with an unconjugated diene.

The polymerization reaction can be performed in the presence of a Ziegler-Natta catalyst system comprising (a) a solid catalyst consisting, for example, essentially of atoms of magnesium, halogen such as bromine or chlorine and at least one transition metal such as titanium, vanadium or zirconium and (b) a cocatalyst based on an organometallic compound of a metal belonging to groups II or III of the Periodic Classification of the Elements. Such a Ziegler-Natta catalyst system is described in French Patent No. 2 405 961. It is also possible to employ a high activity catalyst based on chromium oxide associated with a granular support based on refractory oxide, activated by a heat treatment at a temperature of at least 250° C. and not more than 1200° C. This catalyst can be any catalyst based on chromium oxide such as, for example, those described in French Patents no 3 609 036 or no 2 570 381. With a view to increasing the efficiency of the polymerization reaction it is advantageous to employ a catalyst based on chromium oxide in the presence of an organometallic compound. The catalyst or the catalyst system can be employed as it is or in the form of a prepolymer.

The polymerization reaction is generally carried out at a temperature of between 0° and 130° C. and at a pressure ranging from 0.5 to 5 MPa. The fluidization gas is generally cooled by means of at least one heat exchanger arranged outside the reactor before being recycled with the aid of the recycling conduit. Besides the alpha olefin(s) to be polymerized, the fluidization gas can contain dienes, hydrogen and a gas which is inert towards the catalyst system or the high activity catalyst, chosen, for example, from nitrogen, methane, ethane, butane, isobutane, pentane or isopentane. It passes through the fluidized bed polymerization reactor in an upward stream with an upward velocity which is generally between 2 and 8 times the minimum fluidization velocity, in particular between 0.2 and 0.8 m/s. The polymer being formed in the reactor generally consists of polymer particles having a weight average diameter of between 0.3 and 2 mm.

BRIEF DESCRIPTION OF THE DRAWINGS

FIG. 1 shows diagrammatically an apparatus according to the invention. This apparatus comprises a fluidized bed polymerization reactor (1), consisting essentially of a vertical cylinder (2) surmounted by a disengagement chamber (3), equipped in its lower part with a fluidization grid (4) and with a recycling conduit (5) connecting the top of the disengagement chamber (3) to the lower part of the reactor which is situated under the fluidization grid (4). This recycle conduit (5) is sequentially provided with a compressor (6) and a heat exchanger (7) and then with feed conduits for ethylene (8), 1-butene (9), hydrogen (10) and nitrogen (11). This reactor comprises a catalyst feed conduit (12). It also comprises an external conduit (13) connecting a lower orifice (14) to an upper orifice (15). The external conduit consists of a horizontal section (16), a vertical section (17) and a horizontal section (18). It is equipped with a lower valve (19), an upper valve (20), a purge conduit (21) fitted with a valve (22) and a discharge conduit (23) fitted with a discharge valve (24). The external conduit (13) is fed with additional gas by the conduit (30) fitted with a valve (31). Furthermore, the external conduit is connected to a draw-off vessel (25) via the discharge conduit (23). The draw-off vessel (25) is equipped with a purge conduit (26) fitted with a valve (27) and with a drainage conduit (28) fitted with a drainage valve (29).

FIG. 2 is identical with FIG. 1 except that the external conduit (13) consists sequentially of a vertical section (32), a horizontal section (33), a vertical section (34) and finally a horizontal section (35) and the that it does not comprise means for withdrawing. Furthermore, the external conduit is equipped with a feed conduit (36) for organometallic compound and with a second additional gas conduit (37). Moreover the reactor (1) is equipped with a draw-off conduit (38).

EXAMPLES

The present invention is illustrated in the following examples, with reference to FIGS. 1 and 2.

Example 1

Manufacture of a Linear Low Density Polyethylene

Figure 1:
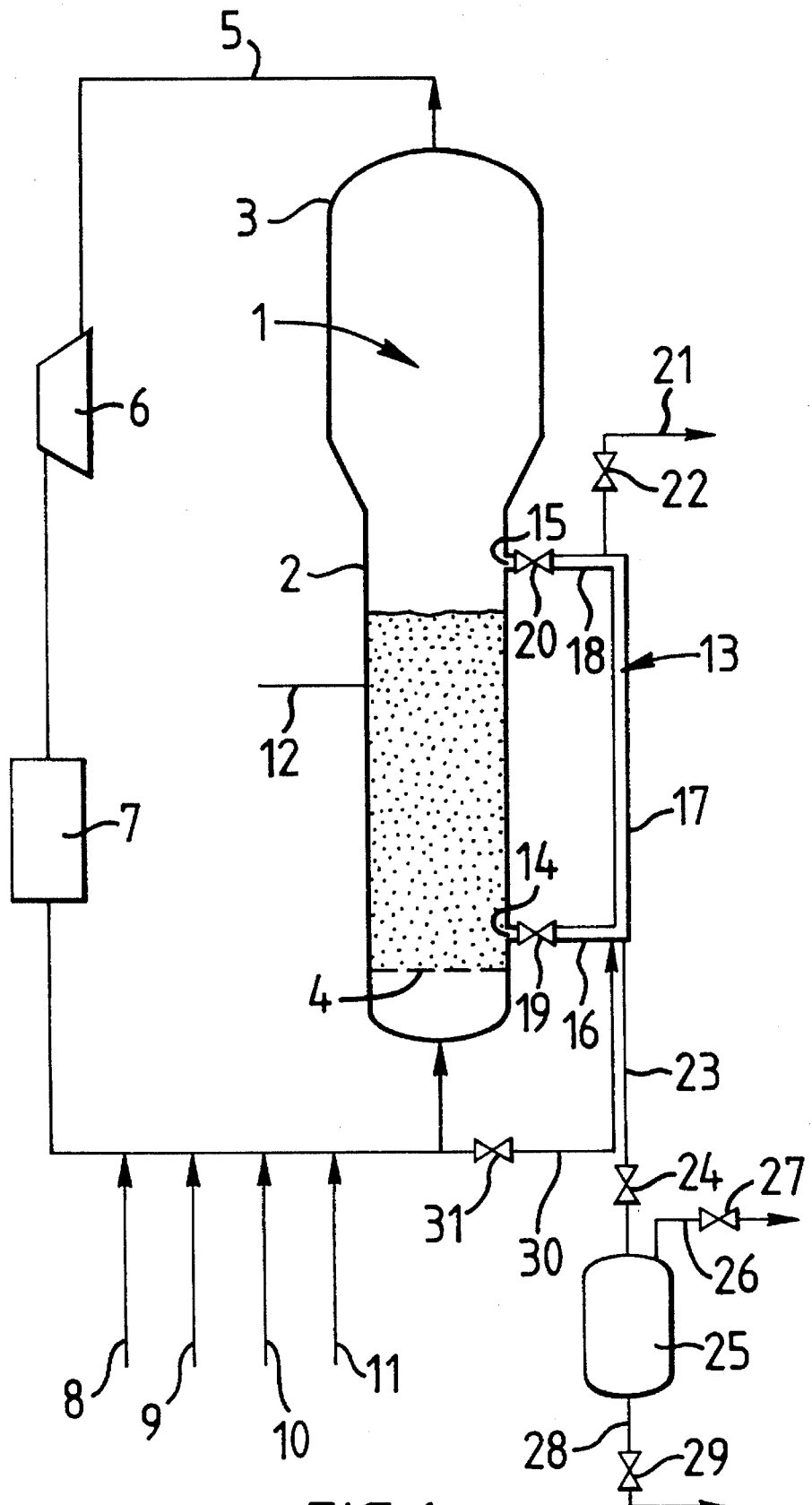
FIG. 1 shows diagrammatically a fluidized bed reactor comprising essentially a vertical cylinder surmounted by a desengagement chamber which is equipped with an external conduit and with a draw-off vessel.

The operation is carried out in a gas phase polymerization reactor containing a fluidized bed such as shown diagrammatically in FIG. 1, comprising a vertical cylinder (2) 90 cm in diameter and 6 m in height. The external conduit (13) consists from the lower orifice (14) to the upper orifice (15) sequentially of a horizontal section (16) 0.5 m in length, a vertical section (17) 3 m in length and a horizontal section (18) 0.5 m in length. The lower orifice (14) is situated on the cylinder (2) just above the fluidization grid (4). The upper orifice (15) is situated vertically above the lower orifice (14). All the sections forming the external conduit (13) are 10 cm in internal diameter.

Above the fluidization grid (4) the reactor contains a fluidized bed maintained at 80° C., 2.5 m in height, consisting of 400 kg of a linear low density polyethylene powder being formed. Moving through this fluidized bed at an upward fluidization velocity of 0.50 m/s is a reaction gas mixture containing 35% of ethylene, 15% of 1-butene, 7% of hydrogen and 43% of nitrogen and which is at a pressure of 1.6 MPa measured just above the fluidized bed.

A catalyst is introduced into the reactor intermittently in the course of time with the aid of the feed conduit (12). The rate of introduction of the catalyst into the reactor is 1 kg/h. The catalyst is identical with that described in Example 1 of French Patent No. 2 405 961, which contains magnesium, chlorine and titanium and which has been converted beforehand into a prepolymer containing 35 g of polyethylene per millimole of titanium and a quantity of tri-n-octylaluminium (TnOA) such that the molar ratio Al/Ti is equal to 0.8. The prepolymer consists of particles having a weight-average diameter of 250 microns Furthermore, a 0.25-molar solution of triethylaluminium in n-hexane is introduced into the reactor at a rate of 250 ml/h.

Under these conditions 100 kg/hour of a polymer which has a relative density of 0.918 is produced.

The drawing off of the polymer is performed by carrying out the following stages successively:

a) the lower (19) and upper (20) valves are opened to introduce polymer and fluidization gas into the external conduit (13); the external conduit (13) is fed by opening the valve (31) via conduit (30) with reaction gas at a temperature of 70° C., a pressure of 1.7 MPa, abstracted from the recycling conduit (5), at a rate of 14 m3/h, b) the lower (19) and upper (20) valves and the valve (31) are closed, then the gas purge valve (22) is opened until a pressure of 0.12 MPa is obtained, c) after closing the valve (22) the draw-off valve (24) is opened so as to discharge the polymer contained in the external conduit towards the draw-off vessel (25).

5.3 kg of polymer are drawn off under these conditions. The draw-off sequence is repeated 19 times per hour.

Example 2

Manufacture of a Linear Low Density Polyethylene

Figure 2:
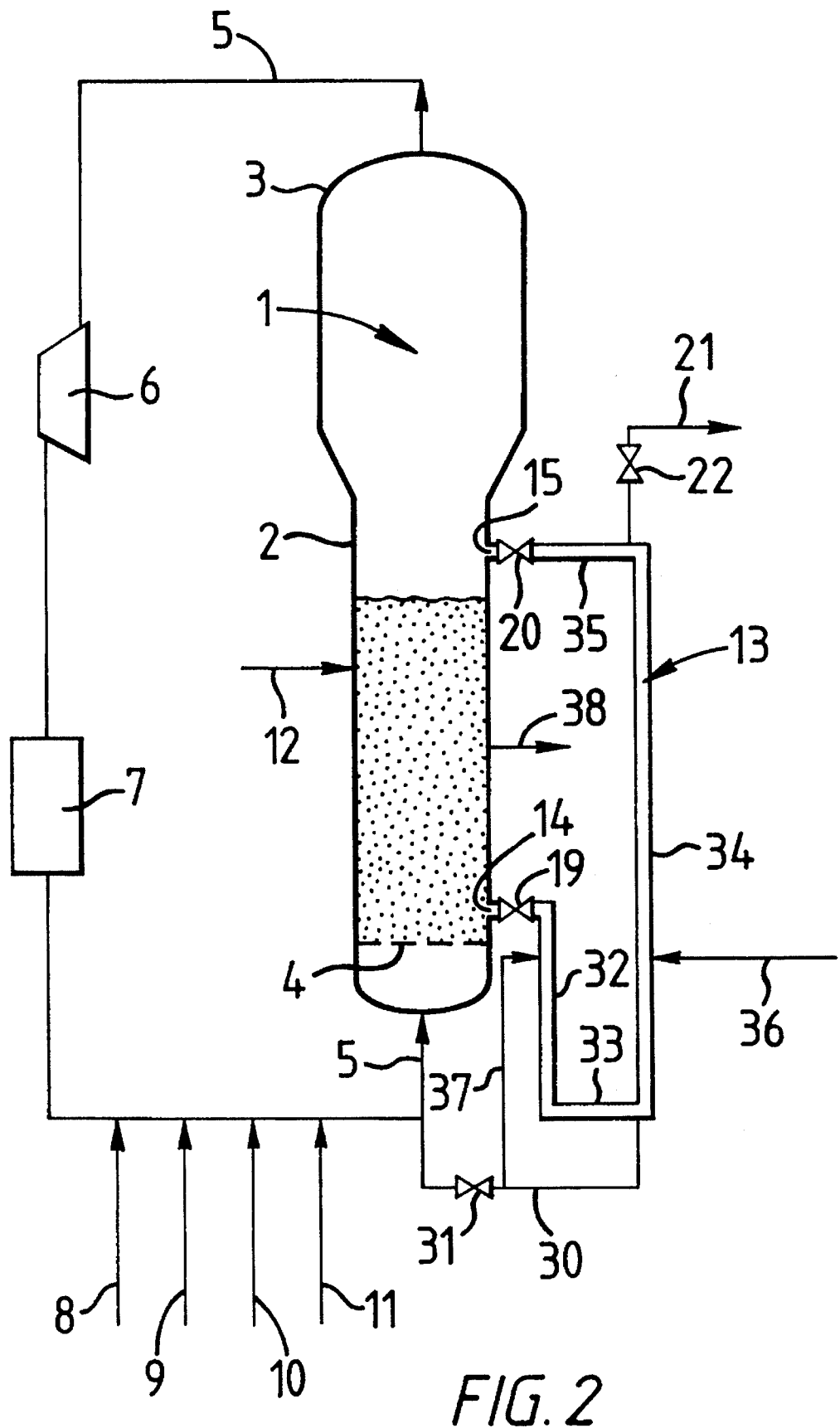
FIG. 2 also shows diagrammatically a fluidized bed reactor which is equipped with an external conduit.

The operation is carried out in a gas phase polymerization reactor containing a fluidized bed as shown diagrammatically in FIG. 2, comprising a vertical cylinder 3 m in diameter and 10 m in height. The external conduit (13) consisting from the lower orifice (14) towards the upper orifice (15) sequentially of a short horizontal section containing a valve (19), a vertical section (32) 4 m in length, a horizontal section (33) 2 m in length, a vertical section (34) 13 m in length and finally a horizontal section (35) with a length slightly greater than 2 m. The lower orifice (14) is situated on the cylinder (2) just above the fluidization grid (4). The distance between the lower orifice (14) and the upper orifice (15) is approximately 9 m. These two orifices are on the same generatrix of the cylinder (2). All the sections forming the external conduit (13) have an internal diameter of 7.60 cm.

Above the fluidization grid (4) the reactor contains a fluidized bed kept at 80° C., 8 m in height, consisting of 15 tonnes of a linear low density polyethylene powder being formed. Passing through this fluidized bed with an upward fluidization velocity of 0.55 m/s is a reaction gas mixture containing 35% of ethylene, 15% of 1-butene, 7% of hydrogen and 43% of nitrogen at a pressure of 2 MPa, measured just above the fluidized bed. A catalyst is introduced intermittently in the course of time with the aid of the feed conduit (12). The rate of introduction of the catalyst into the reactor is kept constant at 23 kg/h. The catalyst is identical with that described in Example 1 of French Patent no 2 405 961, which contains magnesium, chlorine and titanium. It has been converted beforehand into a prepolymer containing 35 g of polyethylene per millimol of titanium and a quantity of tri-n-octylaluminium (TnOA) such that the molar ratio Al/Ti is equal to 1.2. The prepolymer consists of particles having a weight-average diameter of 250 microns, Furthermore, a 0.25-molar solution of triethylaluminium in n-hexane is directly introduced into the external conduit (13) at a rate of 4 l/hour with the aid of the feed conduit (36).

The external conduit (13) is fed with a reaction gas mixture at a temperature of 70° C., a pressure of 1.9 MPa, abstracted from the recycling conduit (5), with the aid of the conduit (37) at a rate of 27 Nm3/h and of the aid of the conduit (30) at a rate of 138 Nm3/h.

Under these conditions a circulation of polymer particles from the lower orifice (14) towards the upper orifice (15) at a rate of 5000 kg/hour is observed in the external conduit (13). A polymer output of 4000 kg/hour, which is drawn off from the reactor through the draw-off conduit (38) is also observed. The polymer produced has a titanium content of 8 ppm.

We claim:

1. A gas phase fluidized bed reactor, comprising:

an upright tubular portion;

a fluidization grid provided in a lower part of said tubular portion;

a lower orifice and an upper orifice in said upright tubular portion, said lower orifice being above said fluidization grid, said upper orifice being above said lower orifice; and external conduit means connecting said lower and upper orifices for circulating polymer exiting said tubular portion through said lower orifice and entering said tubular portion through said upper orifice.

2. A reactor according to claim 1, wherein said external conduit means is equipped with isolation means for isolating said external conduit means from said reactor.

3. A reactor according to claim 2, wherein said isolation means comprises a lower valve which is positioned in said external conduit means towards said lower orifice and an upper valve positioned towards said upper orifice.

4. A reactor according to claim 1, wherein said external conduit means is equipped with a means for withdrawing polymer from said external conduit means.

5. A reactor according to claim 1, wherein said external conduit means is equipped with feed conduits.

6. A reactor according to claim 1, wherein a part of said external conduit means extends below said lower orifice.

* * * * *